US006956642B2

(12) United States Patent
Franke et al.

(10) Patent No.: US 6,956,642 B2
(45) Date of Patent: Oct. 18, 2005

(54) ERROR FUNCTION ANALYSIS OF OPTICAL COMPONENTS

(76) Inventors: Jorge Eduardo Franke, 5815 Meadow Dr., Orefield, PA (US) 18069; John Sargent French, 23 Fetterman Rd., Palm, PA (US) 18070; Sheldon Louis Sun, 3616 Aster St., Allentown, PA (US) 18104; William Joseph Thompson, 9671 Oakview Rd., Kempton, PA (US) 19529

( * ) Notice: Subject to any disclaimer, the term of this patent is extended or adjusted under 35 U.S.C. 154(b) by 52 days.

(21) Appl. No.: 10/426,637

(22) Filed: May 1, 2003

(65) Prior Publication Data

US 2003/0189701 A1 Oct. 9, 2003

Related U.S. Application Data

(63) Continuation-in-part of application No. PCT/US02/09359, filed on Mar. 27, 2002.

(60) Provisional application No. 60/279,586, filed on Mar. 29, 2001.

(51) Int. Cl.[7] ................................................ G01N 21/00

(52) U.S. Cl. ...................................................... 356/73.1

(58) Field of Search ........................ 356/73.1; 398/9–38

(56) References Cited

U.S. PATENT DOCUMENTS 3,892,494 A 7/1975 Baker et al.
5,548,399 A 8/1996 Takai et al.
5,566,088 A 10/1996 Herscher et al.
5,579,145 A * 11/1996 Bogdan et al. ................ 398/9
5,652,668 A 7/1997 Aulet et al.
5,808,760 A 9/1998 Gfeller
5,841,667 A 11/1998 Martin
5,870,211 A 2/1999 Yoshida
6,201,600 B1 3/2001 Sites et al.
6,259,543 B1 7/2001 Golovchenko et al.
6,304,350 B1 10/2001 Doerr et al.
6,373,563 B1 4/2002 Stimple et al.
6,851,086 B2 2/2005 Szymanski

* cited by examiner

*Primary Examiner*—Tu T. Nguyen

(57) ABSTRACT

A device and method that performs error analysis of an optical component. An optical transmitter transmits a test signal at a plurality of selected optical power levels. A port outputs the test signal to the optical component, and then receives a version of the test signal from the optical component. A receiver determines errors in the received version of the test signal. A processor determines an error rate at each of the selected optical power levels based on the determined errors, and also determines an uncertainty range for each determined error rate. An interface provides indication of the determined error rates in relation to the determined uncertainty ranges.

22 Claims, 11 Drawing Sheets

ERROR FUNCTION ANALYSIS OF OPTICAL COMPONENTS

CROSS-REFERENCE TO RELATED APPLICATIONS

The present application is a continuation-in-part of PCT/US02/09359 filed on Mar. 27, 2002, and claims priority under 35 U.S.C. 119 to U.S. Provisional Patent Application No. 60/279,586 filed Mar. 29, 2001, which are hereby incorporated by reference in their entirety for all purposes.

BACKGROUND OF THE INVENTION

1. Field of the Invention

This invention relates generally to optical communication systems. In particular, the invention pertains to error analysis of optical components in optical communication systems.

2. Description of the Background Art

Opto-electronic components, including fiber optics cables, connectors, transmitters, receivers, switches, routers and all other types of optical components, have become the backbone of the modern telecommunication infrastructure. Due to their extremely low error rate and wide bandwidth, optical communication systems have supported an explosion in the growth of data communication systems, such as the Internet. As the need for components in such systems increases, the need for accurate testing of these systems also increases.

Each component within an optical communication system must be tested to ensure that it meets technical standards that have been set in the industry. Additionally, the components must be tested to assess their performance in various real world conditions. This testing can be labor intensive, tedious and time consuming.

A known testing scheme 10 is shown in FIG. 1. The scheme 10 typically includes an optical transmitter 12, an optical attenuator 14, an optical monitor 16 and a receiver 18, such as an optical or electrical receiver. The device under test 25 (DUT) is placed between the transmitting side 20 (which comprises the transmitter 12, the attenuator 14 and the optical monitor 16) and the receiving side 22 (which comprises the receiver 18). All of these components are then interconnected with fiber optic cables and connectors.

In order to test the DUT 25, a technician energizes the optical transmitter 12 which transmits a test signal. The optical test signal is transmitted from the optical transmitter 12, through the optical attenuator 14, through the DUT 25 and is received by the receiver 18. The technician adjusts the gain of the optical attenuator 14 until the optical monitor 16 indicates that the output optical power is at a predetermined level for testing the DUT 25. The DUT 25 is tested at this predetermined optical power and the number of errors in the received signal is measured at the receiver 18. A bit error rate (BER) of the DUT 25 at the predetermined optical power is determined, in accordance with Equation 1:

$$BER = \frac{\text{errors}}{\text{total number of bits received}}. \quad (1)$$

This value is compared to a specified BER for that specific power level, to determine whether the DUT 25 meets the industry standard.

There are drawbacks to this approach. Although the test results at the specified power level may be acceptable, the DUT 25 may perform unexpectedly poor at other power levels, in particular higher power levels. To illustrate, a DUT 25 may be expected to have a BER of $10^{-9}$ at the specified power level. However, at a much greater power level, a well behaved DUT 25 may be expected to have a BER of $10^{-16}$. Although the DUT 25 may test at the specified power level with a BER of $10^{-9}$, it may have a BER of $10^{-10}$ at the higher power level. As a result, the DUT 25 in real world conditions would have an unacceptable performance.

To evaluate the DUT 25 for such conditions, the DUT 25 may be tested at other optical power levels. Using the BERs at these optical power levels, the BER measurements of the DUT 25 are plotted on log paper, as shown in FIG. 2 for example. The optical power in decibel milliwatts (dBm) is plotted on the horizontal axis against the logarithm to the base 10 ($\log_{10}$) of the BER on the vertical axis.

However, constructing these plots can be extremely time consuming and tedious. Additionally, testing using these logarithmic plots typically requires an engineer to evaluate the plotted relationships. As shown in FIG. 2, all of plotted data does not fall on straight line 28. As a result, the engineer must analyze the raw data to determine whether the error rate versus power relationship is an indicator of poor performance of the DUT 25, or merely an acceptable statistical deviation from the norm. This testing procedure is labor intensive and is susceptible to human error. Accordingly, it is desirable to have alternate approaches for error analysis of optical components.

SUMMARY OF THE INVENTION

The present invention is therefore directed to a device and method for performing error analysis of optical components, which substantially overcome one or more of the problems due to the limitations and disadvantages of the background art.

In accordance with an exemplary embodiment, a device for performing error analysis of optical components includes an optical transmitter that transmits a test signal at a plurality of selected optical power levels; a port that outputs the test signal to an optical component and receives a version of the test signal from the optical component; a receiver that determines errors in the received version of the test signal at the plurality of selected optical power levels; a processor that determines an error rate at each of the selected optical power levels based on the determined errors, and that determines an uncertainty range for each of the determined error rates; and an interface that provides indication of the determined uncertainty ranges in relation to the determined error rates.

In accordance with another exemplary embodiment of the present invention, a method of error analysis of optical components includes transmitting a test signal at a plurality of selected optical power levels to an optical component; receiving a version of the test signal from the optical component; determining errors in the received version of the test signal; determining an error rate at each of the selected optical power levels based on the determined errors; determining an uncertainty range for each determined error rate; and providing indication of the determined uncertainty ranges in relation to the determined error rates.

BRIEF DESCRIPTION OF THE DRAWINGS

The invention should be best understood from the following detailed description when read with the accompanying drawings, which are presented merely as examples and which should not be construed as limiting. It should be understood that the various features in the figures are not necessarily drawn to scale. Also, the dimensions may be arbitrarily increased or decreased for clarity.

DETAILED DESCRIPTION OF THE PREFERRED EMBODIMENTS

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials are omitted for the sake of brevity.

Figure 1:
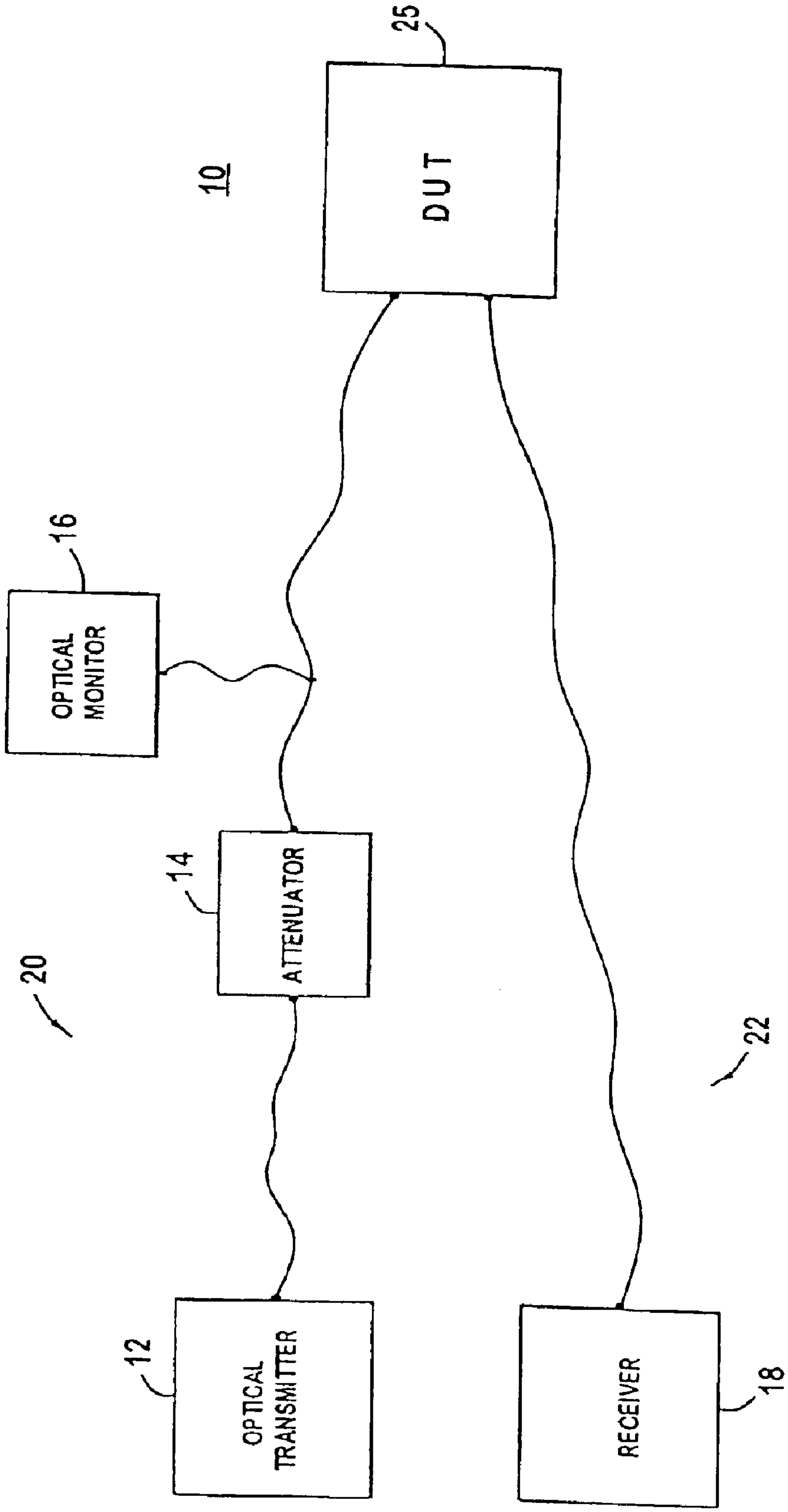
FIG. 1 is an illustration of a known testing scheme.
Figure 2:
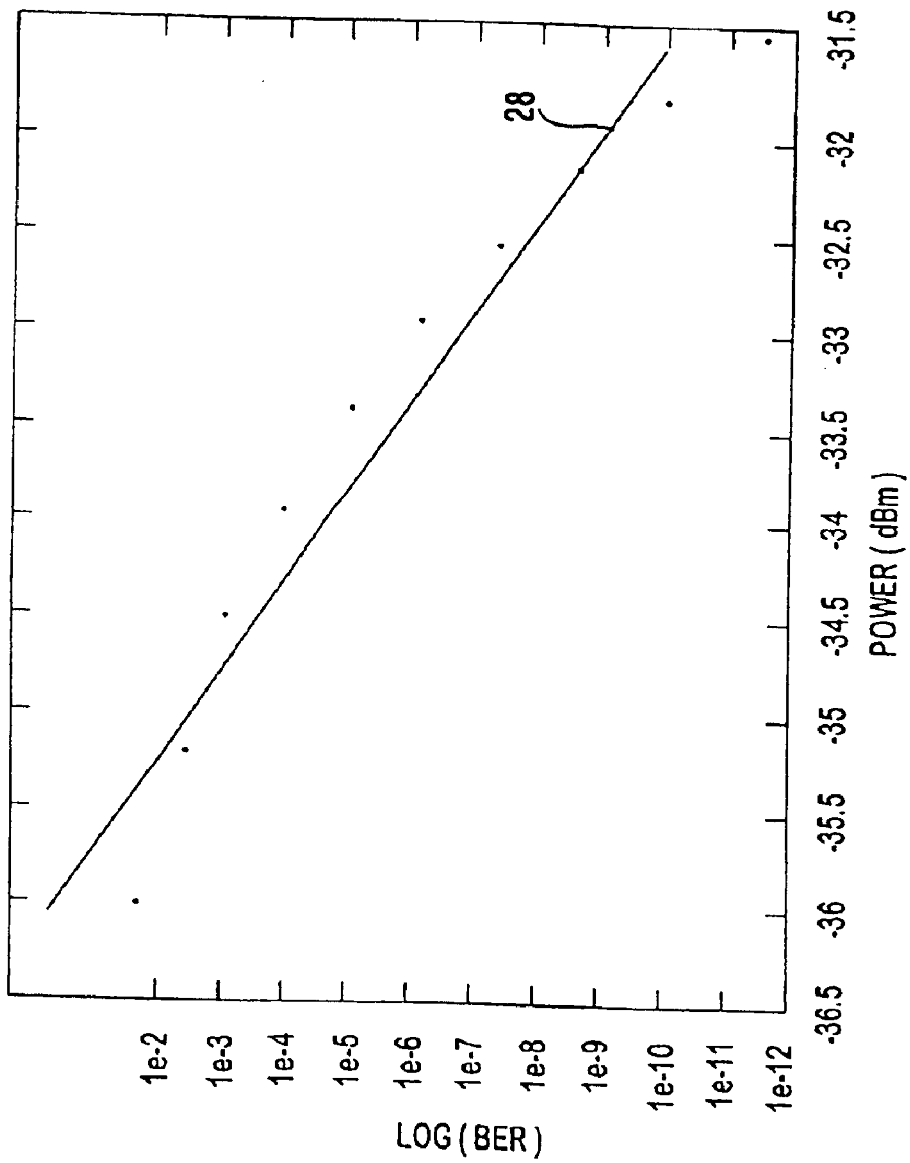
FIG. 2 is an illustration of a known plot of a logarithm of the bit error rate versus optical power in decibel milliwatts (dBm)
Figure 3:
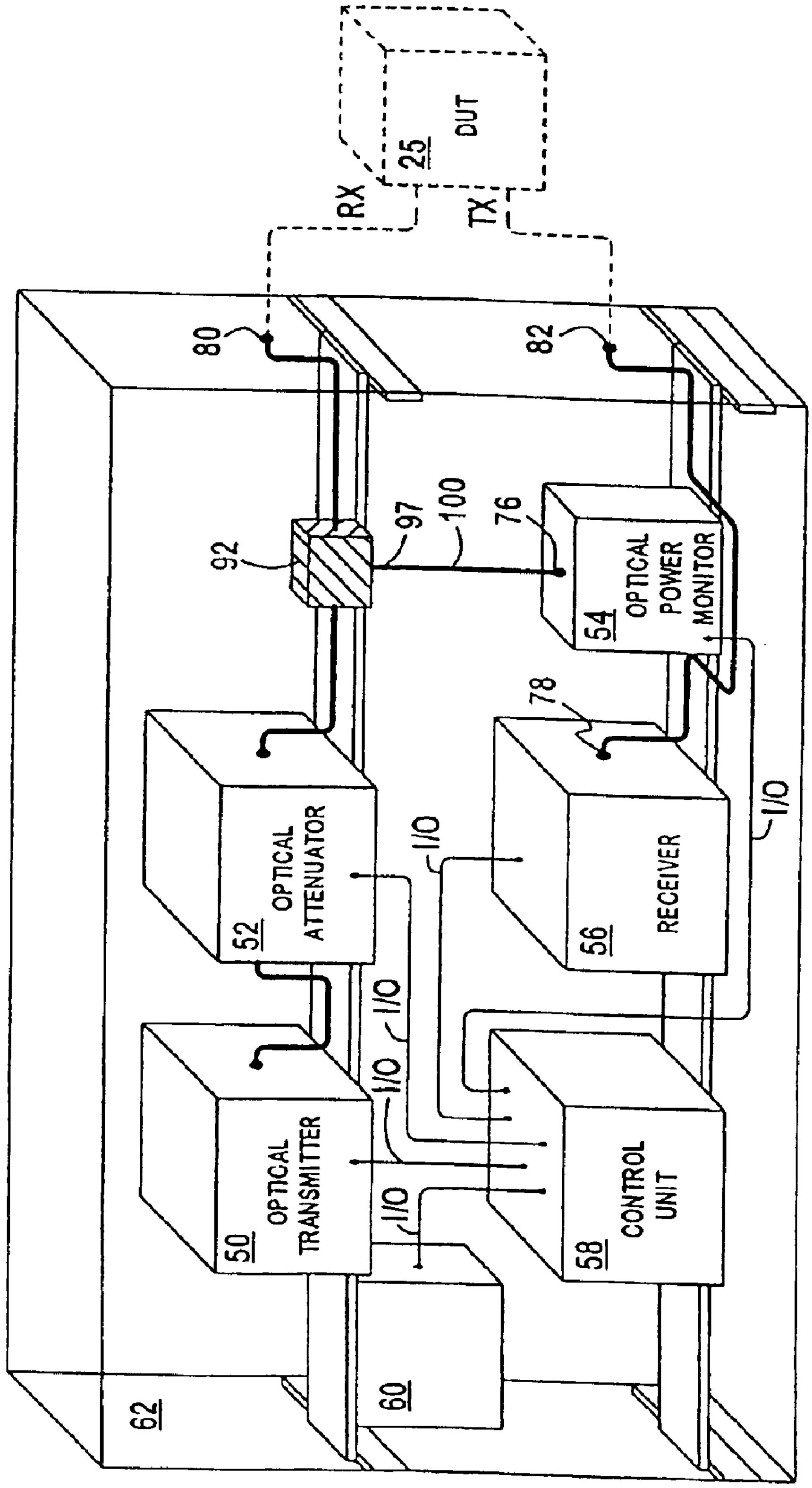
FIG. 3 is an illustration of an error analysis system of the present invention.

A system for error analysis of the invention is shown in FIG. 3. The system includes an optical transmitter 50, an optical attenuator 52, an optical power monitor 54, an optical receiver 56, a control unit microprocessor 58, an optical splitter 92 and a user interface 60. User interface 60 may be a graphical user interface for example, but in the alternative may be any type of user interface such as a keyboard or a mouse, a CRT screen and associated mouse for selecting different options on the screen, or a printer or device for sending e-mails of analysis results for display by a user via the Internet or a network system. Also, for convenience, all of the above noted components may be located in unitary housing or chassis 62 to be portable. Unitary housing 62 includes output port 80, which provides an output signal from optical alternator 52 via optical splitter 92 and along the corresponding optical cable, to DUT 25 connected thereto. Also, input port 82 of unitary housing 62 is coupled to DUT 25 and provides a signal therefrom to optical receiver 56 via the corresponding optical cable. Incidentally, an optical cable is also provided between optical splitter 92 and optical power monitor 54.

Each of the optical components 50–56 has a control input/output (I/O) that couples each optical component 50–56 with the control unit 58. These I/O control connections permit the control unit 58 to control all of the optical components 50–56 from a common point and also permit the output from each of the optical components 50–56 to be monitored by the control unit 58. Having a single control unit 58 also permits calibration of all of the optical components 50–56 from a common point of control, which allows for software instead of manual calibration. The control unit 58 also includes an I/O control interconnection (I/O) with the user interface 60, to permit the control unit 58 to communicate with the user interface 60 and also to accept user input via the user interface 60.

Figure 4:
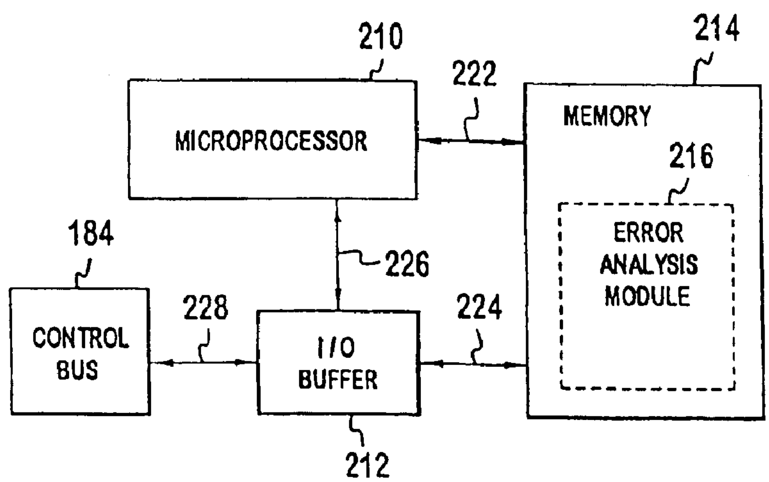
FIG. 4 is an illustration of a control unit of the error analysis system of FIG. 3.

FIG. 4 illustrates control unit 58 in greater detail. Control unit 58 includes a microprocessor 210, an input/output (I/O) buffer 212, and an associated memory 214. The memory 214 stores error analysis programming in error analysis module 216, and also stores other software and any other information such as the determined number of errors at each power level, which are required to be stored by the control unit 58. Several data buses 222, 224 and 226 facilitate the flow of data between the microprocessor 210, the memory 214 and the I/O buffer 212. Another data bus 228 facilitates the flow of data between the I/O buffer 212 and a control bus 184, whereby control bus 184 communicates with the user interface 60. Although the microprocessor 210 is illustrated herein as including an I/O buffer 212, in an alternative embodiment the microprocessor 210 could have direct access to the memory 214, to eliminate the need for the I/O buffer 212.

Figure 5:
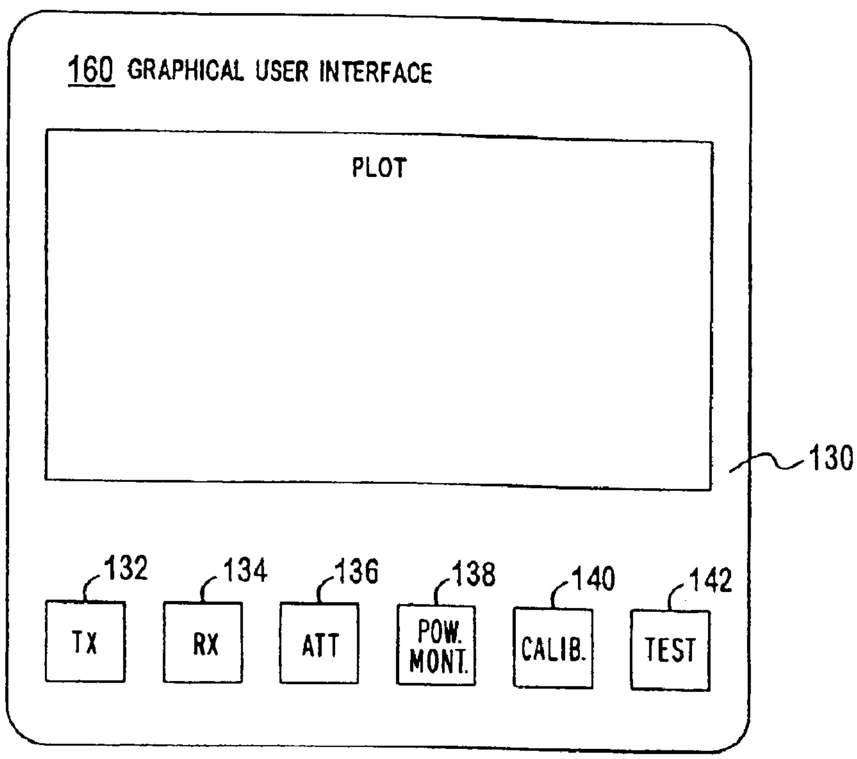
FIG. 5 is an illustration of a graphical user interface of the error analysis system of FIG. 3.

FIG. 5 shows the details of a graphical user interface used as user interface 160 in an embodiment of the invention. Graphical user interface 160 includes a touch-sensitive screen 130, which changes depending upon which of graphical buttons 132–142 are selected. For example, the graphical buttons may include transmitter button 132, receiver button 134, attenuator button 136, power monitor button 138, calibration routine button 140, and test routine button 142. However, it should be understood that different types and numbers of buttons 132–142 may be provided on screen 130 or programmed as desired by the user, to implement or control various functions or testing routines including the error analysis, and that the set up of screen 130 as illustrated in FIG. 5 should not be construed as limiting.

Testing of the DUT 25 will now be explained in conjunction with the flow chart of FIG. 6. In order to test DUT 25, the DUT 25 is connected to the ports 80 and 82 of the housing 60 by an operator. The operator selects test button 142 displayed on the screen 130 of the graphical user interface 160 illustrated in FIG. 5, for example. The control unit 58 initiates a test of the DUT 25 at various optical powers by controlling the optical attenuator 52. The signal returned by the DUT 25 may be optical, electrical or even acoustical. In the case of an electrical or acoustical signal, correspondingly appropriate cables and receivers would be incorporated into the system of FIG. 3. The test range used would depend on the type of DUT 25. A range of power levels for testing may be set either automatically or by user input. One possible user input range may be $10^{-4}$ or $10^{-5}$ BER to $10^{-10}$ BER, for example. If set automatically, the uppermost tested power level is determined by adjustment of the power level under control of control unit 58, until a point is found where some errors are made in a reasonable time period. A lowermost tested power level is determined by adjustment of the power level just prior to a point where an unreasonably high number of errors is made, such as in the range between $10^{-5}$ or $10^{-4}$ BER.

Accordingly, testing of DUT 25 is initiated by microprocessor 210 of control unit 58 by transmitting a test signal from optical transmitter 50 at selected optical powers within the corresponding range, in step S30. Although any number of test points can be selected, a typical range is 5–20 test points. The errors produced by the DUT 25 are thereafter determined at the receiver 56, in step S32. For example, optical transmitter 50 may transmit a predetermined test pattern, and optical receiver 56 would then compare the received pattern with the predetermined test pattern, to thus determine errors. The DUT 25 is tested at each of the selected power levels, until a specified number of errors is detected. A typical value for the number of errors is 10 errors. To prevent an extremely long test period at low error rates, a time limit may be set. The test is ended when either the specified number of errors is received or the time limit expires. However, the time limit may be overridden by the user. Alternately, the testing may be performed until a specified uncertainty is reached. In a still further alternative, the DUT 25 is tested at each power level for a specified time period, regardless of the measured number of errors.

The number of detected errors at each power level and the total number of bits received are stored in the memory 214, at step S34. The test parameters, such as testing power levels and number of errors detected at each power level, may be selected by a user input, although a default setting for these parameters may be used.

Figure 7:
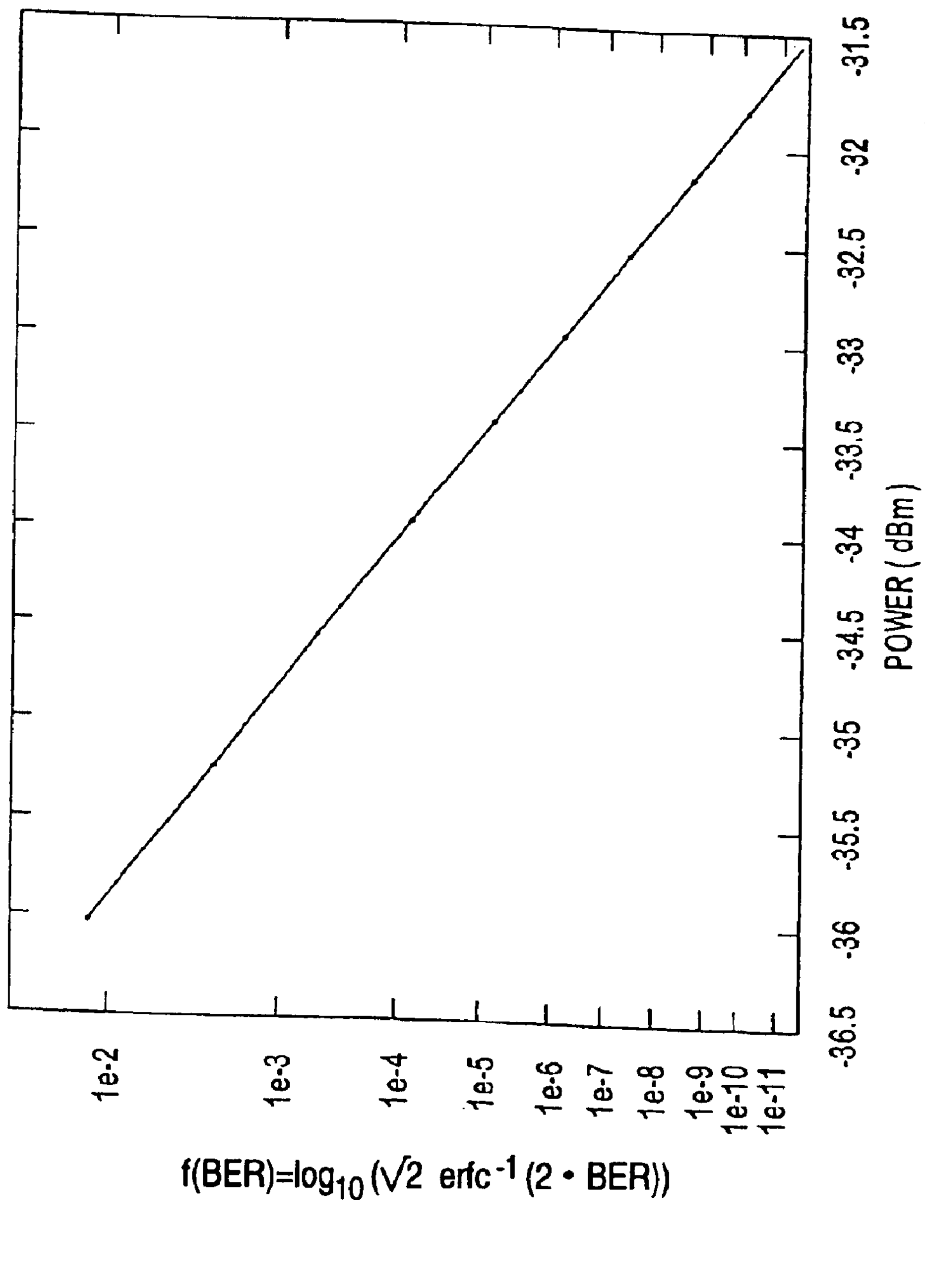
FIG. 7 is an illustration of a plot of a function associated with the BER versus optical power in dBm of the present invention.

When the requisite number of errors at each power level is accumulated, the BER is determined by the microprocessor 210, in step S36. The microprocessor 210 produces a plot of the information as shown in FIG. 7, to be displayed on the graphical user interface 60. It should be understood that although a line is shown on the plot of FIG. 7 and in the other figures, the line is for illustrative purposes and is not necessary to be included. The horizontal axis of the plot in FIG. 7 has units representing the optical power level, such as milliwatts or dBm. Along the vertical axis is a function associated with the BER, and which is linear in a "well behaved" DUT 25. Errors in a "well behaved" DUT 25 should be dominated by noise, which exhibits a gaussian distribution. Accordingly, one approach to produce a linear model is a version of a complementary error function associated with the BER. The accumulated data is converted into data points for plotting. The selected power levels and the associated BER function are determined. The resulting data points (associated BER function versus power) are plotted, in step S38. A line is drawn using a best fit approach, such as a least squares fit, in step S40.

Additionally, a linearity test may be performed on the tested results. The result of the linearity test may also be displayed on the graphical user interface 60, to provide a measure of discrepancy between the line drawn and the points provided.

Figure 8:
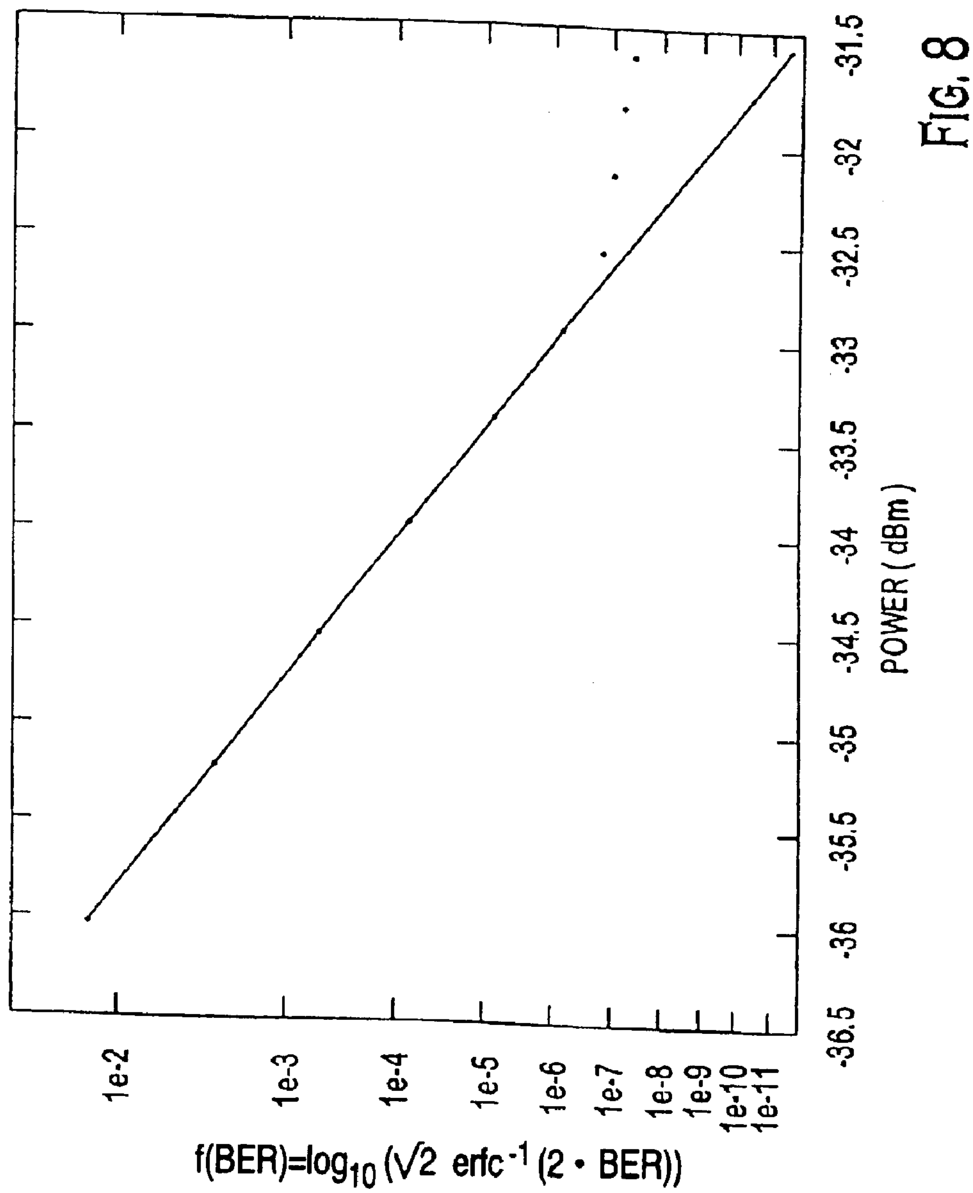
FIG. 8 is an illustration of a flattening curve.

By viewing the plotted data and the line, the technician can verify whether the device is functioning properly. If the data points are distant from the best fit line, this indicates that the device is not well behaved. If the data points are close to the line, this indicates that the device is well behaved. The flattening of the curve as shown in FIG. 8 is highly undesirable for a DUT 25. Such a curve suggests the existence of an "error floor." An "error floor" is a lower limit to the number of errors produced by an optical component independent of the optical power. This type of linearity analysis is much more important to a network designer than a sensitivity measurement. A DUT 25 can have an acceptable sensitivity but have an unacceptable "error floor." Additionally, if the DUT 25 yields a straight line plot, the network designer can have some confidence in its behavior. Adherence to a straight line suggests that the DUT 25 behaves well even at error rates far below those actually tested.

To explain the linear relationship between a complementary error function associated with the BER and the optical power in an example of the present invention, the following is provided. The effect of noise on a transmitted signal can be modeled statistically. An optical signal has symbols of one of two values, represented by a 0 and 1. When sending a one, the transmitter typically transmits light at a selected power level. When sending a zero, typically minimal or zero light is transmitted. At the receiver 56, the value of each received soft symbol is compared to a threshold value and a hard decision is made whether the received soft symbol is a one or a zero. When noise decreases a symbol representing a one to a level below the hard decision threshold, an error is made at the receiver. Similarly, when noise increases a symbol representing a zero to a level above the threshold, an error is also produced.

Received soft symbols produce two gaussian distributions. The mean $\mu_0$ and the mean $\mu_1$ respectively represent the mean of the power level of the zero soft symbol and the mean of the power level of the one soft symbol. The variances $\sigma_0^2$ and $\sigma_1^2$ represent the quantity of noise present at each level, respectively. The rate at which errors occur is related to the "closeness" of the decision threshold to the noisy zero or one level. This "closeness" is measured by the Q-factor for each level i, i =0 or 1, as in Equation 2:

$$Q_i = \frac{|D - \mu_i|}{\sigma_i}, \tag{2}$$

wherein D represents the decision level.

To determine the proportion of zero soft symbols erroneously identified as a one $P_{01}$, the proportion of zero soft symbols above the hard decision value is determined. One approach to predict this proportion for a "well behaved" receiver is to use a gaussian distribution. For all zero symbols coming into the device, the fraction erroneously identified as ones $P_{01}$ is given by the fraction of the gaussian distribution (representing noise on the zeros) above the decision threshold D. This proportion $P_{01}$ is the area under the normalized gaussian between the decision threshold D and infinity ∞. This area can be determined using the complementary error function (erfc). Using the complementary error function, the proportion of erroneously identified ones $P_{01}$ is determined such as by Equation 3:

$$P_{01} = \frac{1}{2} erfc\left(\frac{Q_0}{\sqrt{2}}\right). \tag{3}$$

Similarly, the proportion of ones erroneously identified as zeros $P_{10}$ is determined such as by Equation 4:

$$P_{10} = \frac{1}{2} erfc\left(\frac{Q_1}{\sqrt{2}}\right). \tag{4}$$

By adding $P_{01}$ to $P_{10}$, the proportion of incorrectly identified symbols is determined. When the decision threshold D is halfway between the zero and one mean levels, the two Q-factors are equal, that is $Q_0=Q_1$. Using Q defined to equal $Q_0=Q_1$, the combined probability of an incorrectly identified symbol can be determined such as by Equation 5:

$$ErrProb = \frac{1}{2} erfc\left(\frac{Q}{\sqrt{2}}\right). \tag{5}$$

Accordingly, if the true BER performance obeys this theoretical result over a wide range of Q values, it suggests that the DUT 25 is "well behaved."

When the optical power level is varied during a test of the DUT 25, the mean value of the received one soft symbols $\mu_1$ will vary. The value of $\mu_1$ is proportional to the optical power level. Since often the decision threshold D and noise variances $\sigma_0^2$ and $\sigma_1^2$ are relatively fixed, the Q-factor is often directly proportional to optical power. As a result, a function error probability g(ErrProb) can be found such that g(ErrProb) versus Q is a straight line. Since the error probability is equivalent to the BER, Equation 6 or an analogous equation can be used:

$$f(BER)=\log_{10}(\sqrt{2}erfc^{-1}(2\cdot BER)) \quad (6).$$

As a result, the plot of f(BER) versus the optical power in dBm should be linear for a "well behaved" DUT 25. Such a plot is shown in FIG. 7. The line in FIG. 7 is shown for illustrative purposes and may not actually be displayed.

The relationship of the logarithm of the BER to optical power in dBm is not a true linear relationship in a "well behaved" DUT 25. Such an approach is a crude approximation of a linear relationship. Accordingly, a function related to a BER function, such as Equation 6, is a better indicator of a well behaved DUT 25. Equation 6 is one illustrative example for deriving a BER function. Under varying conditions, the theoretical straightness of the plot is robust. Accordingly, this approach to analyzing optical components can be used in a variety of applications, such as electrical and acoustical.

Figure 6:
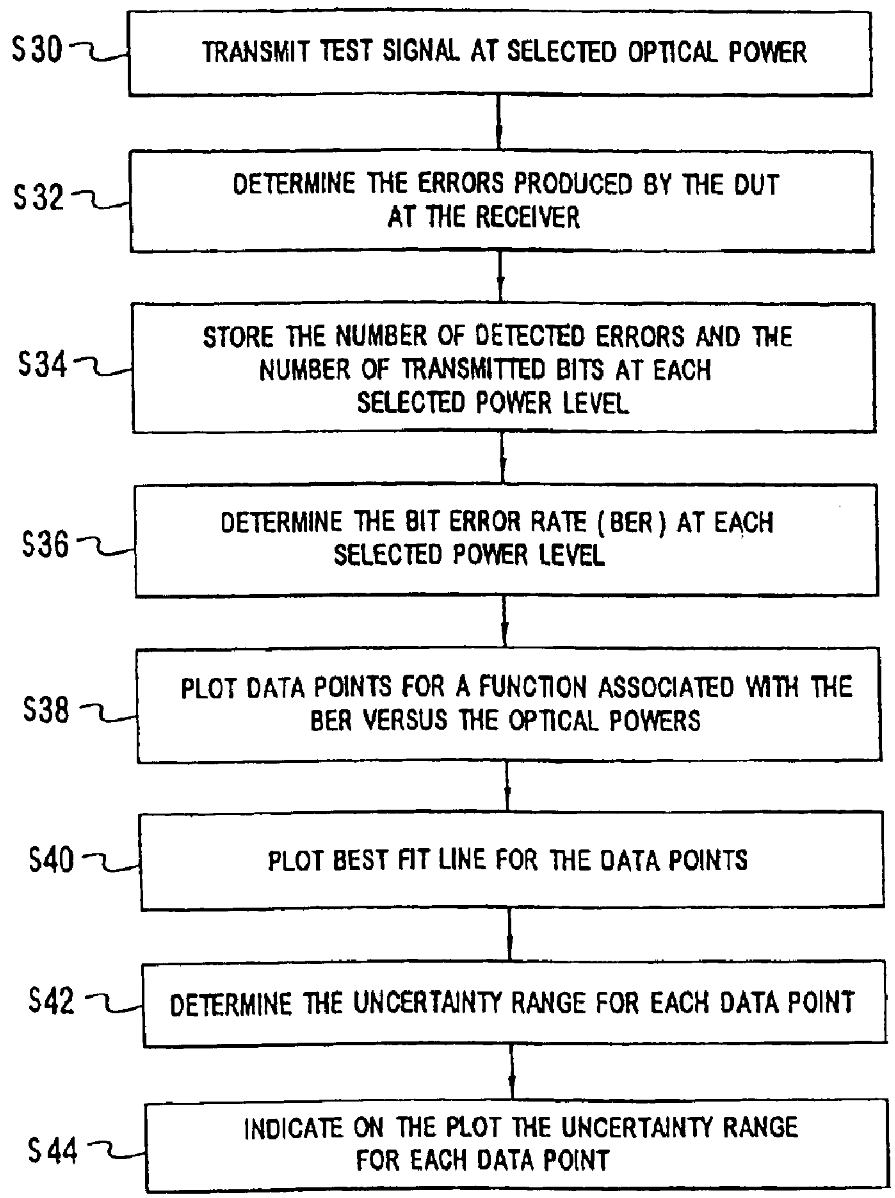
FIG. 6 is a flow chart of error analysis performed by the error analysis system of FIG. 3.

Returning to the flow chart of FIG. 6, subsequent to plotting a line using a best fit approach in step S40, an indicator of the uncertainty of each data point is determined and displayed. The uncertainty range for each data point is determined in step S42. One approach to determining the uncertainty is to determine the standard deviation σ of each determined BER. The following example illustrates a binomial distribution, although others such as a Poisson distribution may be used. The uncertainty can be displayed as one or a multiple of the standard deviation. A user may define the desired uncertainty range for the test. By using a binomial distribution, the standard deviation σ of each BER can be determined such as by Equation 7:

$$\sigma_{BER} = \sqrt{\frac{bits^2}{bits-1}\frac{errs}{bits}\left(1-\frac{errs}{bits}\right)}, \quad (7)$$

wherein errs is the received errors and bits is the total number of received soft symbols. If the BER has already been determined, Equation 7 can be rewritten as Equation 8:

$$\sigma_{BER} = \sqrt{\frac{bits^2}{(bits-1)}BER(1-BER)}\,. \quad (8)$$

Analogous equations are used for other distributions, such as a Poisson distribution. The microprocessor 210 determines the standard deviation σ for each data point, such as by using Equation 8. If no errors were received for one of the power levels during the test, the standard deviation is approximated using confidence levels based on a Poisson distribution.

Figure 9:
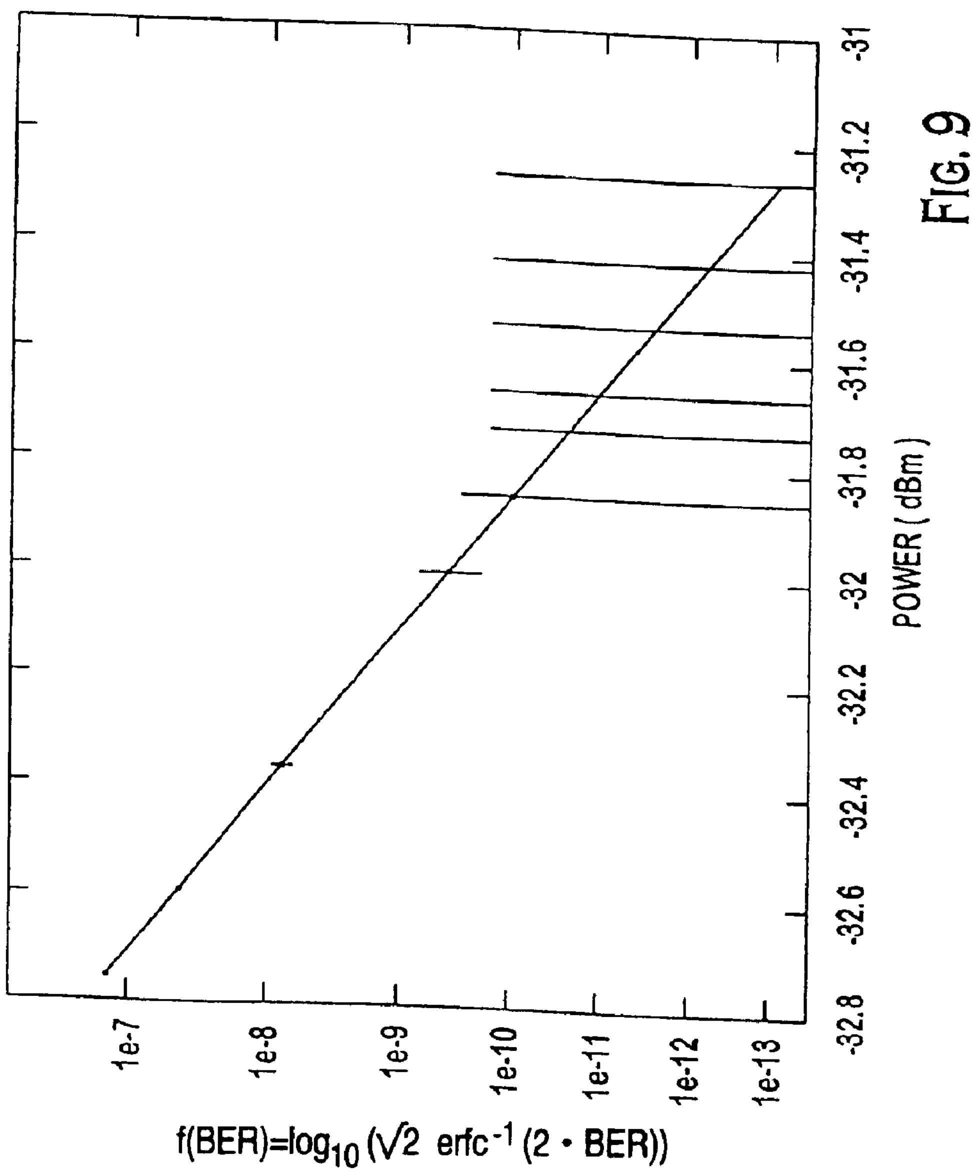
FIG. 9 is an illustration of a plot of uncertainty ranges.

The uncertainty range for each data point is then indicated on the plot displayed by the graphical user interface 60, in step S44. As shown in FIG. 9, the uncertainty may be indicated by using lines on the plot. For each data point, a line is drawn above and below indicative of the uncertainty range. If the standard deviation is used for the uncertainty range, a line is drawn from one standard deviation above the data point to one standard deviation below the data point. Alternately, the user may select an uncertainty defined as a multiple of one standard deviation. When the vertical axis is a function associated with the BER, one standard deviation above the data point is determined by adding the standard deviation to the measured BER (BER+σ) and a function associated with that value is taken. Similarly, for one standard deviation below the data point, the standard deviation is subtracted from the measured BER (BER−σ) and a function associated with that value is taken.

The uncertainty range is of particular relevance to analyzing data points at low BERs. Lower error rates require long testing periods to achieve a large number of errors. If testing at the lower error rates is ended too quickly, the determined BER has a high uncertainty. Accordingly, any conclusions drawn from that data may be suspect. The uncertainty indicators can indicate to the operator this high uncertainty. As a result, the operator can run additional tests at these suspect power levels to reduce the uncertainty.

Figure 10:
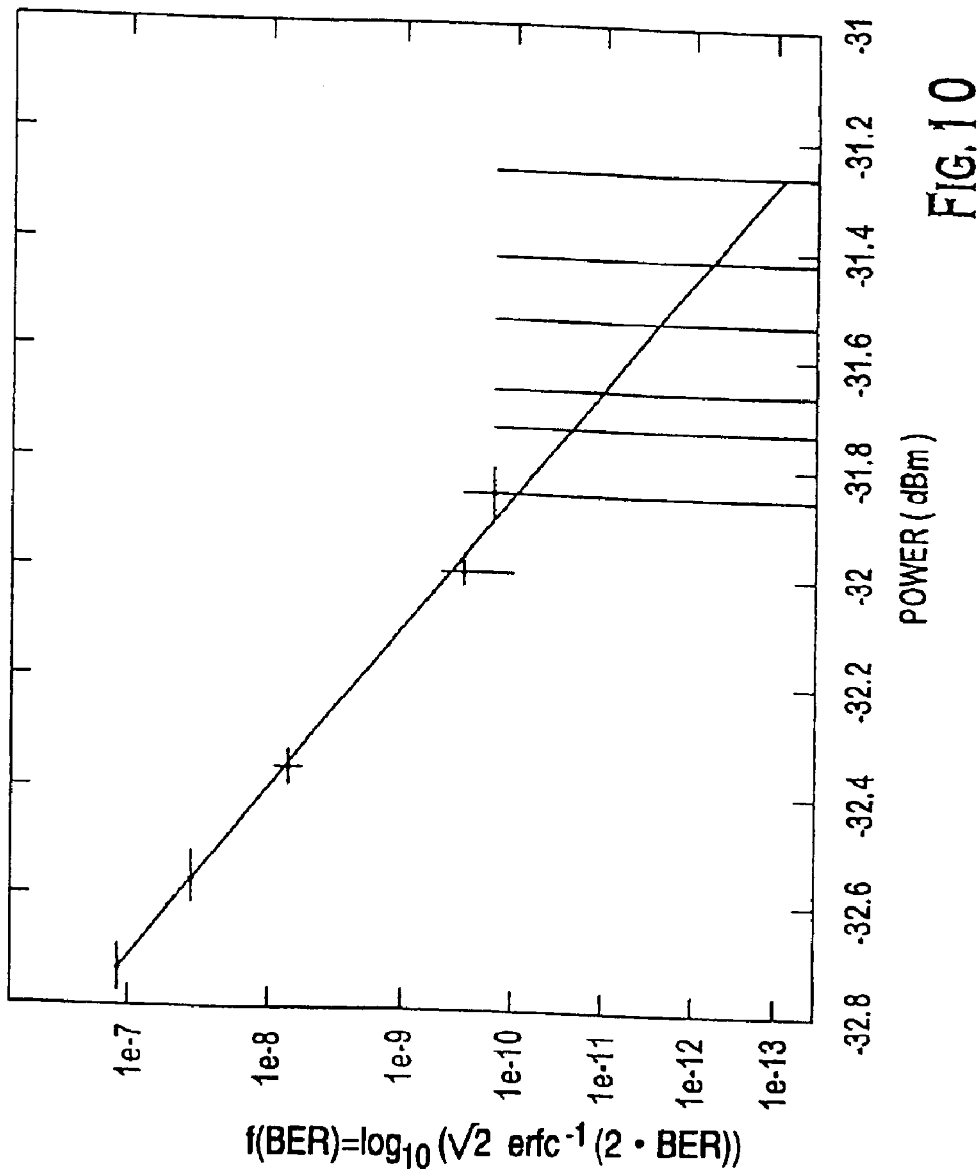
FIG. 10 is an illustration of a plot of uncertainty ranges including power level uncertainty.

To provide a better indication of the actual uncertainty of each data point, a power level uncertainty is also shown on the plot, as shown in FIG. 10. The power level uncertainty is based on the precision and possibly the accuracy of the optical monitor 16, and minor fluctuations in the output power of the optical transmitter and attenuator combination. The minor fluctuations in the output power are measured by the optical monitor 16. These fluctuations and the uncertainty of the optical monitor measurements are modeled to determine the standard deviation in the power level. To show the power level uncertainty, a line is drawn from a value one standard deviation of the power level below the data point to a value one standard deviation above the data point.

The power level uncertainty is important for a complete understanding of the testing limitations. The uncertainty in the measured BER can be reduced by running the tests for a longer period of time. However, minor fluctuations in output power and resolution of the optical monitor will not improve to a large extent with additional testing. As a result, the power level bars will not decrease significantly during testing and an uncertainty will be present regardless of the testing length.

One approach to provide a dynamic aspect to testing is to produce the plots during accumulation of the errors. After testing at each specified power level is complete, a plot of the data points with a best fit line and the uncertainty range is displayed on the graphical user interface 60. As the testing progresses, the plot is updated with the uncertainty ranges, which typically decrease. When an operator reaches a confidence in the plotted data, the operator can stop the testing. As a result, the testing can be performed for the minimum duration required by the operator.

Another application for the uncertainty is to allow a user to initially set a specified uncertainty for the data points, through a user input. Errors are collected for each data point until the specified uncertainty is met.

Figure 11:
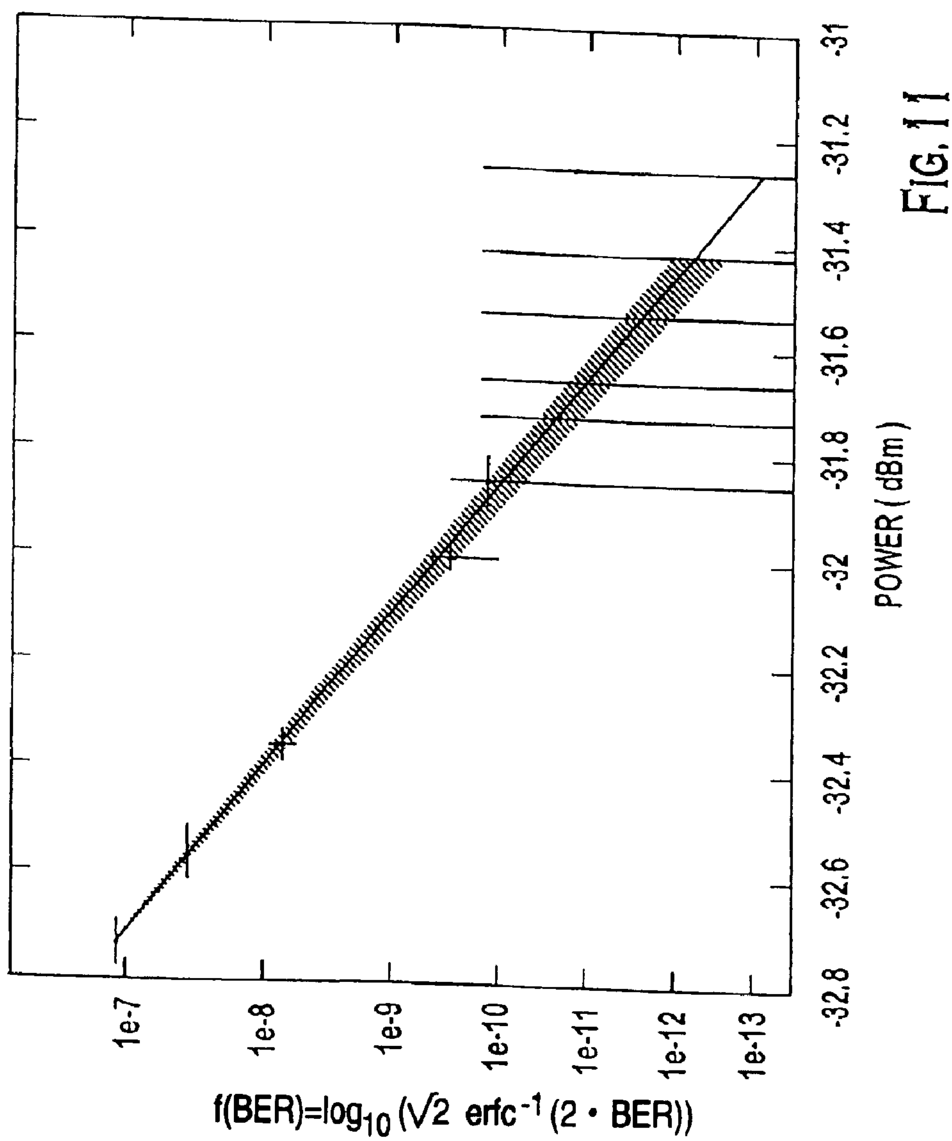
FIG. 11 is an illustration of uncertainty line ranges.

To illustrate the uncertainty in the determined best fit line, a range of possible lines can be shown on the plot, as shown in FIG. 11. One approach to generate the range of lines is to draw a line with a maximum slope and a line with a minimum slope that fits within the data uncertainty.

The invention having been described in detail, it will be readily apparent to one having ordinary skill in the art that the invention may be varied in a variety of ways. Such variations are not to be regarded as a departure from the scope of the invention. All such modifications as would be obvious to one of ordinary skill in the art, having had the benefit of the present disclosure, are intended to be included within the scope of the appended claims and the legal equivalents thereof.

What is claimed is:

1. A device for performing error analysis of optical components, comprising:

an optical transmitter that transmits a test signal at a plurality of optical power levels;

a port that outputs the test signal to an optical component and receives a version of the test signal from the optical component;

a receiver that determines errors in the received version of the test signal at the plurality of optical power levels;

a processor that determines an error rate at each of the optical power levels based on the determined errors, and that determines an uncertainty range for each of the determined error rates; and an interface that provides indication of the determined uncertainty ranges in relation to the determined error rates.

2. The device of claim 1, wherein the determined uncertainty ranges for the determined error rates are respectively one standard deviation or multiple standard deviations above and below the determined error rates.

3. The device of claim 2, wherein a user defines the uncertainty ranges.

4. The device of claim 2, wherein one standard deviation is determined using a statistical distribution.

5. The device of claim 4, wherein the statistical distribution is a binomial distribution.

6. The device of claim 4, wherein the statistical distribution is a Poisson distribution.

7. The device of claim 4, wherein the statistical distribution uses a Poisson distribution and a binomial distribution.

8. The device of claim 1, wherein the interface comprises a graphical device that provides a visual plot of the determined error rates with indication of the determined uncertainty ranges.

9. The device of claim 8, wherein the graphical device plots the determined uncertainty ranges as lines extending from points representing the determined error rates.

10. The device of claim 1, wherein the determined error rates and the determined uncertainty ranges are updated during error analysis.

11. The device of claim 1, wherein error analysis is performed at each of the optical power levels until a specified uncertainty is reached for the selected optical power levels.

12. A device for performing error analysis of optical components, comprising:

an optical transmitter that transmits a test signal at a plurality of optical power levels;

a port that outputs the test signal to an optical component and receives a version of the test signal from the optical component;

a receiver that determines errors in the received version of the test signal; and a processor that determines an error rate at each of the optical power levels based on the determined errors, and continues testing at each optical power level of the optical component until a specified uncertainty level is met.

13. A method of error analysis of optical components, comprising:

transmitting a test signal at a plurality of optical power levels to an optical component;

receiving a version of the test signal from the optical component;

determining errors in the received version of the test signal;

determining an error rate at each of the optical power levels based on the determined errors;

determining an uncertainty range for each determined error rate; and providing indication of the determined uncertainty ranges in relation to the determined error rates.

14. The method of claim 13, wherein said providing indication comprises producing a visible plot of the determined error rates with indication of the uncertainty ranges.

15. The method of claim 14, wherein the determined uncertainty ranges for the determined error rates are respectively one standard deviation or multiple standard deviations above and below the determined error rates.

16. The method of claim 15, wherein one standard deviation is determined using a statistical distribution.

17. The method of claim 16, wherein the statistical distribution is a binomial distribution.

18. The method of claim 16, wherein the statistical distribution is a Poisson distribution.

19. The method of claim 16, wherein the statistical distribution uses a Poisson distribution and a binomial distribution.

20. The method of claim 14, wherein the determined uncertainty ranges are plotted as lines extending from points representing the determined error rates.

21. The method of claim 13, wherein the determined error rates and the determined uncertainty ranges are updated during error analysis.

22. The method of claim 14, wherein testing at each of the optical power levels is performed until a specified uncertainty is reached for the optical power levels.

* * * * *